United States Patent
Feldbaum et al.

(10) Patent No.: US 7,340,824 B2
(45) Date of Patent: Mar. 11, 2008

(54) METHOD FOR FABRICATING A MAGNETIC HEAD HAVING AN IMPROVED MAGNETIC SHIELD

(75) Inventors: Michael Feldbaum, San Jose, CA (US); John I. Kim, San Jose, CA (US); Murali Ramasubramanian, San Jose, CA (US); Howard Gordon Zolla, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 392 days.

(21) Appl. No.: 10/883,141

(22) Filed: Jun. 30, 2004

(65) Prior Publication Data

US 2006/0002022 A1    Jan. 5, 2006

(51) Int. Cl.
*G11B 5/127* (2006.01)
*H04R 31/00* (2006.01)

(52) U.S. Cl. .............. 29/603.16; 29/603.13; 29/603.15; 29/603.18; 360/121; 360/122; 360/126; 360/317; 427/127; 427/128; 451/5; 451/41

(58) Field of Classification Search ............... 29/603.13–603.16, 603.18; 360/121, 122, 360/126, 317; 427/127, 128; 451/5, 41
See application file for complete search history.

(56) References Cited

U.S. PATENT DOCUMENTS

| 5,617,277 | A | 4/1997 | Chen et al. ............... 360/113 |
|---|---|---|---|
| 5,898,548 | A | 4/1999 | Dill et al. ................ 360/113 |
| 6,342,993 | B1 | 1/2002 | Sato ......................... 360/319 |
| 6,381,107 | B1 | 4/2002 | Redon et al. ............ 360/324.2 |
| 6,614,629 | B1 | 9/2003 | Kakihara ................ 360/324.1 |
| 6,628,484 | B2 * | 9/2003 | Werner ..................... 360/319 |
| 2002/0135948 | A1 | 9/2002 | Funayama et al. ...... 360/324.1 |
| 2002/0181163 | A1 | 12/2002 | Werner ..................... 360/319 |
| 2003/0145453 | A1 | 8/2003 | Kamata et al. ........... 29/603.1 |

OTHER PUBLICATIONS

NIST ATP Epion company overview.

* cited by examiner

*Primary Examiner*—Paul D. Kim
(74) *Attorney, Agent, or Firm*—Robert O. Guillot; Intellectual Property Law Offices

(57) ABSTRACT

A first magnetic shield layer of the read head sensor is deposited upon a slider substrate surface. A patterned photoresist is then photolithographically fabricated upon the first magnetic shield layer with openings that are formed alongside the location at which the read sensor will be fabricated. An ion milling step is performed to create pockets within the surface of the magnetic shield layer at the location of the openings in the photoresist layer. The photoresist layer is then removed, and a fill layer is deposited across the surface of the magnetic shield layer in a depth greater than the depth of the pocket. Thereafter, a polishing step is conducted to remove portions of the fill layer down to the surface of the magnetic shield layer. A G1 insulation layer is deposited and a magnetic head sensor element is then fabricated upon the insulation layer.

11 Claims, 7 Drawing Sheets

METHOD FOR FABRICATING A MAGNETIC HEAD HAVING AN IMPROVED MAGNETIC SHIELD

BACKGROUND OF THE INVENTION

1. Field of the Invention

The present invention relates generally to methods for fabricating read sensors for magnetic heads, and more particularly to methods for fabricating the first magnetic shield of a sensor.

2. Description of the Prior Art

Magnetic heads for hard disk drives typically contain a read head element for reading magnetic data bits from the magnetic media disk, and a write head for writing magnetic data bits onto the magnetic media disk. Focusing on the read head element, a typical prior art read head includes a magnetoresistive sensor element in which the electrical resistance of the sensor is influenced by the magnetic field of a data bit that passes close to the sensor. To avoid interference from neighboring data bits and other local magnetic fields, the sensor is disposed between two magnetic shield layers that serve to screen out such interfering magnetic fields. In order to achieve greater areal data storage density within the magnetic media, magnetic data bits are written in increasingly smaller sizes, and the magnetic shields must therefore be spaced closer together in order to effectively perform their shielding task. As a result of the narrowing of the gap between the magnetic shields, the various layers of materials that form the magnetic sensor structure are likewise made thinner. Where electrical insulation layers are made thinner as a part of this process the likelihood of electrical shorts between sensor components increases. Additionally, it becomes more important that the thinner layers and structures be made as planar as possible in order to avoid topological problems and variations in the thickness and properties of these layers. The present invention focuses upon topological features related to the first magnetic shield layer.

In prior art magnetic head fabrication processes, a patterned bilayer photoresist milling mask is fabricated upon the first magnetic shield, and pockets are milled within the first magnetic shield at openings formed in the mask, such that an unmilled centrally disposed shield surface area remains for the fabrication of the sensor thereabove. A fill layer is next deposited across the wafer, and within the pockets. The mask is removed and a first insulation layer (G1) is deposited. The MR sensor is fabricated above the central shield area, and electrical leads are subsequently fabricated to project from the sensor towards the electrical interconnects of the magnetic head. The milling of the pockets typically creates an unwanted deposit of milled shield material, termed fences, at the upper edges of the pockets due to redeposition of shield material during the ion milling process. Also insulation voids are often created at the upper edges of the pockets due to shadowing effects proximate the fences. In prior art magnetic heads where the spacing between the shields was relatively large, the layers of materials forming the sensor were also relatively thick, and the redeposited shield material fences and voids were not of significant concern. However, in more advanced heads, where the shields are made closer together and the sensor layers are made correspondingly thinner, the redeposited shield material fences and the voids, and other topological anomalies of the prior art magnetic head fabrication process become significant. Electrical shorts and corrosion effects become serious problems. The present invention provides a fabrication method which avoids these problems.

SUMMARY OF THE INVENTION

The magnetic head fabrication method of the present invention is directed towards the fabrication of the read head sensor components of the magnetic head. In the fabrication method a first magnetic shield layer is deposited upon a slider substrate surface. A patterned photoresist is photolithographically fabricated upon the first magnetic shield layer with openings that correspond to the pocket locations alongside a central shield surface area, above which the read sensor of the magnetic head will be fabricated. An ion milling step is performed to create pockets within the surface of the magnetic shield layer at the locations of the openings in the photoresist layer. The photoresist layer is then removed, and a fill layer is deposited across the surface of the magnetic shield layer in a depth greater than the depth of the pockets. Thereafter, a polishing step is conducted to remove portions of the fill layer down to the surface of the magnetic shield layer. An insulation layer, typically referred to as the G1 insulation layer, is next deposited. The many layers, structures and process steps as are known in the prior art are next undertaken to fabricate the magnetic head sensor element upon the G1 insulation layer, followed by the typical steps undertaken to complete the fabrication of a magnetic head.

In a preferred embodiment, the photoresist is a single layer photoresist, and the pocket is formed in the magnetic shield layer utilizing an ion milling process that is directed towards the magnetic shield surface, typically at an angle of approximately 25° from normal to the magnetic shield surface, such that redeposition of the magnetic shield material is minimized. The photoresist is preferably removed utilizing a wet chemical stripping process and the fill layer is polished utilizing a chemical mechanical polishing step.

It is an advantage of the method for fabricating a magnetic head of the present invention that a magnetic head sensor having increased reliability characteristics is provided.

It is another advantage of the method for fabricating a magnetic head of the present invention that projecting redeposited magnetic shield material fences at the edge of the magnetic shield pockets are eliminated.

It is a further advantage of the method for fabricating a magnetic head of the present invention that voids between the fill layer and the upper edge of the pockets in the first magnetic shield are eliminated.

It is yet another advantage of the method for fabricating a magnetic head of the present invention that a clean smooth surface for the fabrication of the magnetic sensor components is provided.

It is yet a further advantage of the method for fabricating a magnetic head of the present invention that the spacing between the magnetic shields of the magnetic head can be reduced without increasing the likelihood of electrical shorts and corrosion of sensor components.

It is still another advantage of the magnetic head of the present invention that the incidence of electrical shorts between the sensor electrical leads and the first magnetic shield is reduced.

It is still a further advantage of the magnetic head of the present invention that the incidence of contamination and corrosion of sensor components is reduced.

It is yet another advantage of the magnetic head of the present invention that the magnetic shield is fabricated with a smooth surface upon which further sensor components are fabricated.

It is an advantage of the hard disk drive of the present invention that it includes a magnetic head of the present invention in which the incidence of electrical shorts between the sensor electrical leads and the first magnetic shield is reduced.

It is another advantage of the hard disk drive of the present invention that it includes a magnetic head of the present invention in which the incidence of contamination and corrosion of sensor components is reduced.

It is a further advantage of the hard disk drive of the present invention that it includes a magnetic head of the present invention in which the magnetic shield is fabricated with a smooth surface upon which further sensor components are fabricated.

These and other features and advantages of the present invention will no doubt become apparent to those skilled in the art upon reading the following detailed description which makes reference to the several figures of the drawing.

IN THE DRAWINGS

The following drawings are not made to scale as an actual device, and are provided for illustration of the invention described herein.

DETAILED DESCRIPTION OF THE PREFERRED EMBODIMENTS

Figure 1:
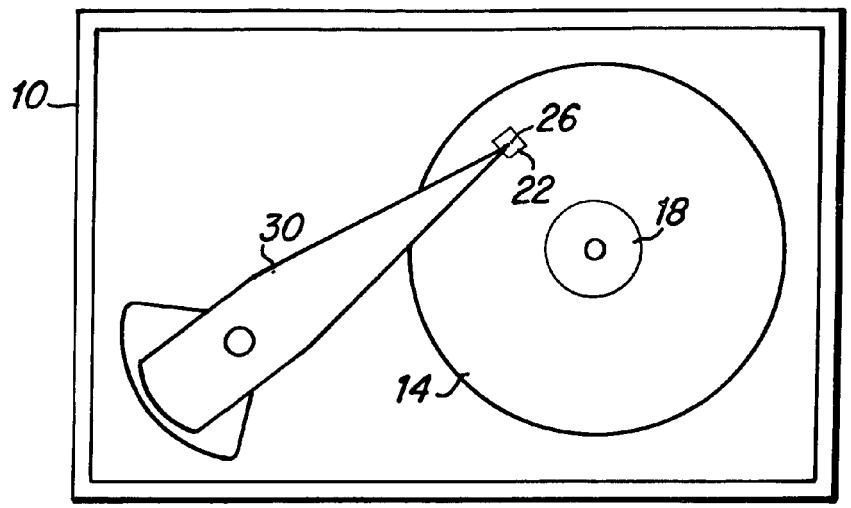
FIG. 1 is a schematic top plan view of a hard disk drive including the magnetic head of the present invention.

A simplified top plan view of a typical hard disk drive 10 which is suitable to include the magnetic head of the present invention is presented in FIG. 1. As depicted therein, at least one hard disk 14 is rotatably mounted upon a motorized spindle 18. A slider 22, having a magnetic head 26 engaged thereon, is mounted upon an actuator arm 30 to fly above the surface of each rotating hard disk 14, as is well known to those skilled in the art. The present invention includes improved features and manufacturing methods for such magnetic heads 26, and to better described the present invention a prior art magnetic head is next described.

Figure 2:
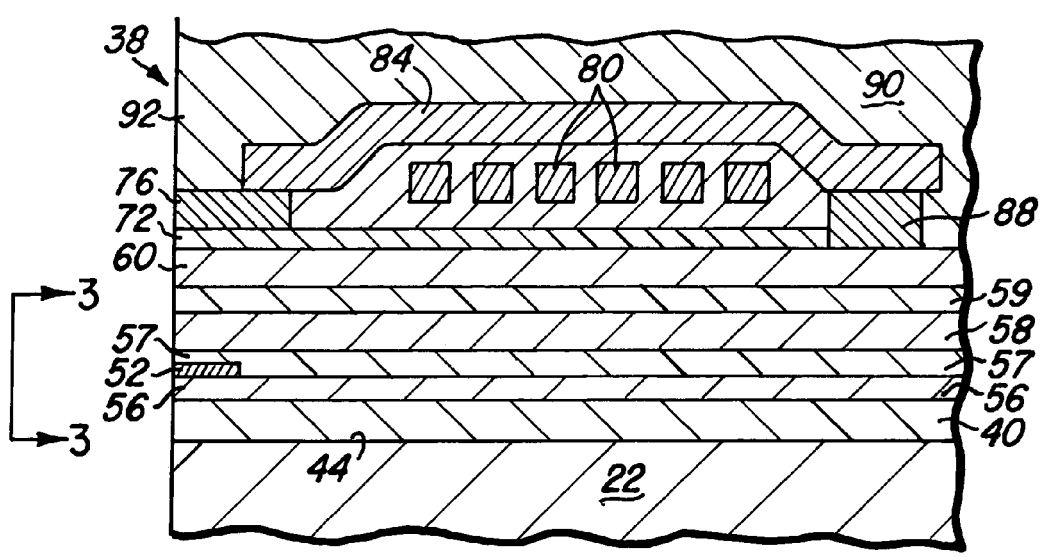
FIG. 2 is a side cross-sectional view depicting various components of a prior art magnetic head.
Figure 3:
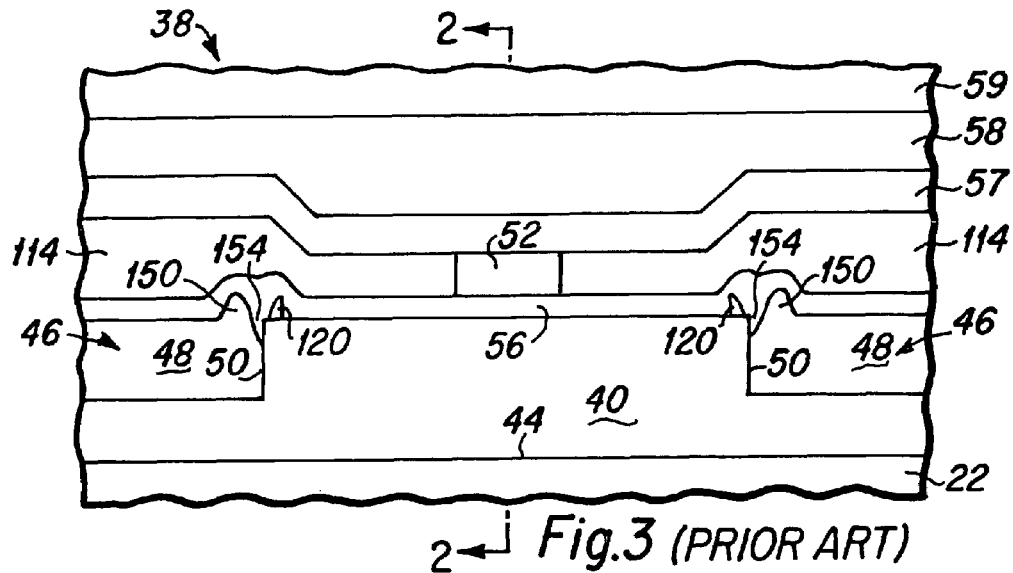
FIG. 3 is an elevational view of the magnetic head depicted in FIG. 2, taken from the ABS along lines 3-3 of FIG. 2.

As will be understood by those skilled in the art, FIG. 2 is a side cross sectional view depicting portions of a basic prior art magnetic head 38, and FIG. 3 is an elevational view of the read head sensor portion of the prior art magnetic head 38 depicted in FIG. 2 taken from the air bearing surface (ABS); lines 2-2 are presented in FIG. 3 to clarify the relationship between FIGS. 2 and 3. As depicted in FIGS. 2 and 3, the magnetic head 38 includes a first magnetic shield layer (S1) 40 that is formed upon a surface 44 of the slider body material 22. Pockets 46 are formed within the S1 shield 40 and a fill layer 48 is deposited within the pockets. The inner edges 50 of the pockets 46 within the S1 shield layer 40 are shown in FIG. 3, whereas the outer edges of the pockets 46 are not shown. A detailed description of the method for fabricating the pockets 46 is provided below. A first insulation layer G1 56 is deposited upon the wafer, and the read head sensor 52 element is fabricated upon the G1 layer 56 above the magnetic shield in areas between the pockets 46. Electrical leads 114 for the sensor 52 are subsequently fabricated above the G1 layer 56. The second insulation layer (G2) 57 is deposited upon the sensor 52 and upon the electrical leads 114, and the second magnetic shield layer (S2) 58 is fabricated above the G2 insulation layer 57. An insulation layer 59 is then deposited upon the S2 shield 58, and a write head portion of the magnetic head 38 is next fabricated.

As is best seen in FIG. 2, a write head portion of the magnetic head 38 is next fabricated, commencing with a first magnetic pole (P1) 60 that is fabricated upon the insulation layer 59. Following the fabrication of the P1 pole 60, a write gap layer 72 is deposited, followed by the fabrication of a P2 magnetic pole tip 76. An induction coil including coil turns 80 may then be fabricated within insulation 82 above the write gap layer 72. A yoke portion 84 of the second magnetic pole is next fabricated in magnetic connection with the P2 pole tip 76, and through a back gap element 88 to the P1 pole layer 60. The head is subsequently encapsulated in alumina 90, and it is finally processed such that an air bearing surface (ABS) 92 is created. It is to be understood that this description omits many detailed fabrication steps that are well known to those skilled in the art, and which are not deemed necessary to describe herein in order to provide a full understanding of the present invention.

A significant problem of the prior art magnetic head 38, as depicted in FIG. 3, involves unwanted magnetic shield redeposition fences 120 and insulation layer bumps 150 and voids 154 that occur at the outer edges of the S1 shield pockets 46. A detailed description of how these unwanted features are created is next presented, followed by a detailed description of the fabrication method of the present invention which eliminates them.

Figure 4:
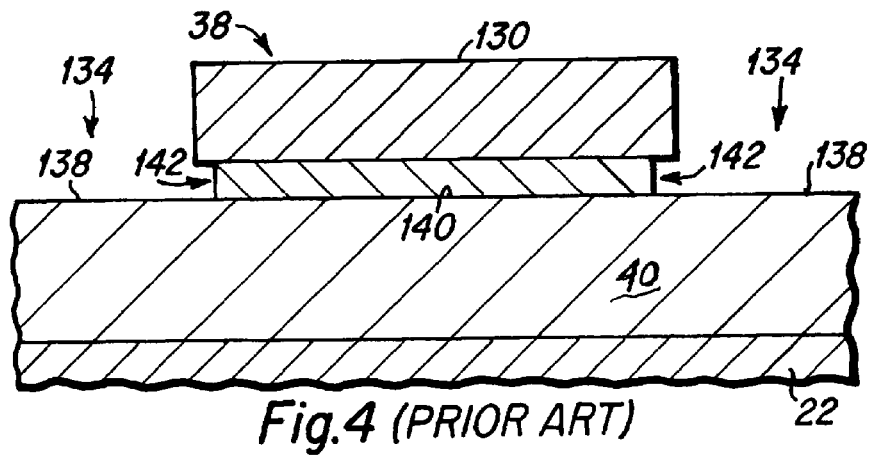
FIGS. 4-7 are elevational views depicting a series of fabrication steps utilized in fabricating the prior art magnetic head depicted in FIG. 3.

FIGS. 4-8 depict a series of prior art fabrication steps that are utilized to create the S1 magnetic shield pockets 46 of the prior art magnetic head 38. With reference to FIG. 4, following the deposition of the first magnetic shield (S1) 40 upon the surface 44 of the slider body material 22, a patterned bilayer photoresist milling mask 130 is fabricated upon the S1 shield surface 138 utilizing well known photolithographic techniques. Openings 134 in the bilayer photoresist are formed to expose the S1 shield surface 138 alongside masked shield surface areas 140 above which the sensor 52 is to be fabricated. A significant feature of such a bilayer photoresist is the creation of an undercut 142 which is provided to facilitate the later removal of the photoresist 130 utilizing standard wet chemical stripping techniques. The undercut 142 contributes to the creation of the unwanted magnetic shield redeposition fences 120 and the insulation material bumps 150 and voids 154, as are next discussed.

Figure 5:
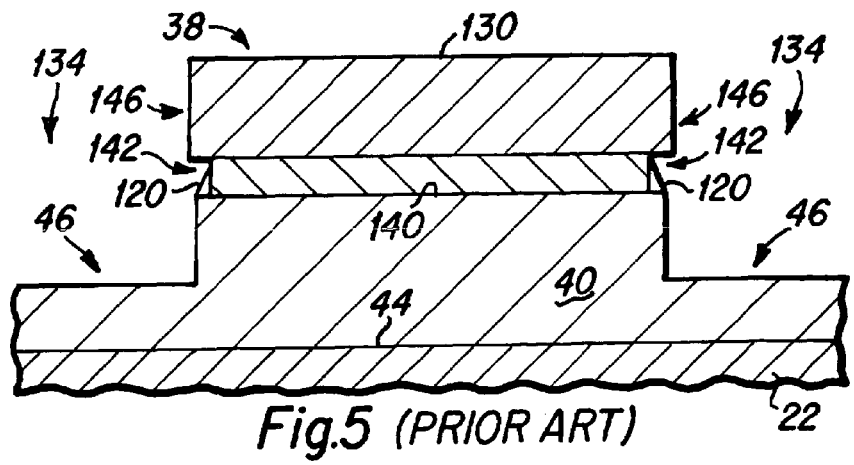
Figure 6:
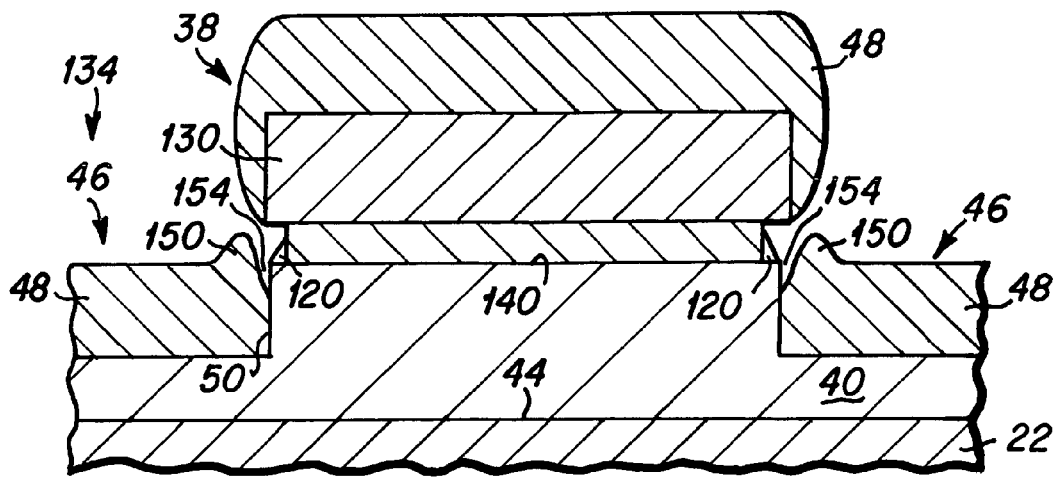

As depicted in FIG. 5, an ion milling step is next conducted to mill out portions of the exposed S1 magnetic shield surface 138 in the openings 134 to create the magnetic shield pockets 46. The ion milling step creates unwanted redeposition of magnetic shield material upon the side surfaces 146 of the bilayer photoresist, and particularly within the undercuts 142 of the bilayer photoresist. Much of the redeposited magnetic shield material is removed by ion milling at a large angle from normal, as is known to those skilled in the art, however the redeposition fences 120 within the undercuts 142 are difficult to remove. Thereafter, as depicted in FIG. 6, a next step in the prior art fabrication process is the deposition of the fill layer material 48, typically alumina. Deposition effects of the bilayer photoresist, typically result in the creation of raised bumps 150 of insulation material proximate the edges of the bilayer photoresist 130. Additionally, the shadowing effect of the bilayer photoresist can result in a failure to fully deposit fill material 48 at the edges 50 of the S1 shield pockets 46. This can result in small voids 154 in the fill material 48 at the edges 50 of the pockets 46 proximate the edges of the shield areas 140.

Figure 7:
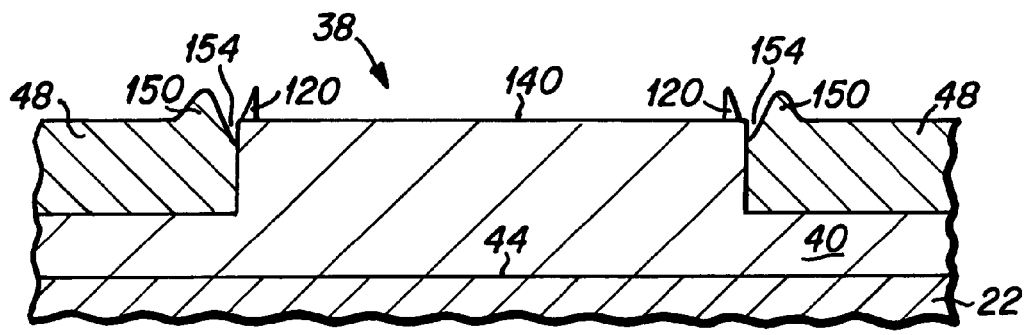

As depicted in FIG. 7, following the deposition of the fill layer 48, the bilayer photoresist 130 is removed by utilizing a wet chemical stripping process. Significantly, following the removal of the bilayer photoresist 130, the S1 shield fences 120 and fill layer bumps 150 and voids 154 remain.

The redeposition fences 120, insulation bumps 150 and insulation voids 154 at the edges of the shield surface areas 140 can create significant topological problems. Particularly, with reference to FIG. 3, following the fabrication of the G1 insulation layer 56 and the sensor element 52 above the shield surface areas 140, electrical leads 114 are fabricated which lead away from the sensor element 52 towards the magnetic head electrical contacts (not shown). These electrical leads 114 from the sensor element 52 must pass over the fences 120 and bumps 150 which thereby create fabrication and performance difficulties. Specifically, where the G1 insulation layer 56 isn't sufficiently thick, an electrical lead 114 can make unwanted contact with the magnetic shield fences 120, and electrical shorting of the lead results. The fill material bumps 150 result in irregularities in the thickness of the G1 insulation layer 56 and of the lead layers 114 that are deposited above them, which can result in unwanted performance difficulties. Contaminants can become resident within the voids 154 and can lead to corrosion of the electrical leads 114 that are fabricated in close proximity to the voids 154, resulting in magnetic head performance problems.

Figure 8:
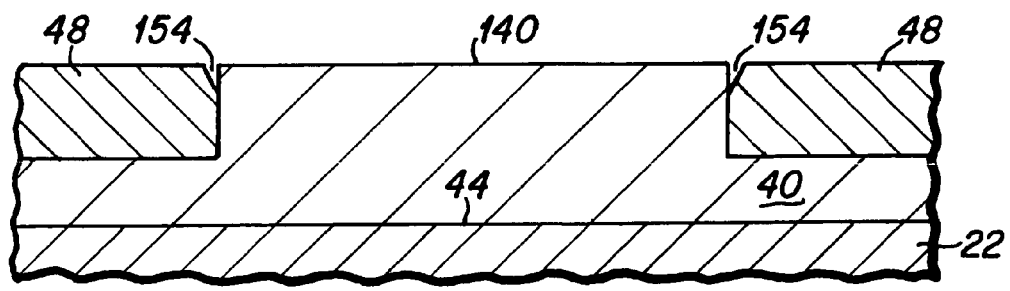
FIG. 8 is an elevational view of a fabrication step of a first embodiment of a magnetic head of the present invention.

As a first embodiment of the present invention which is directed towards correcting these problems, a chemical mechanical polishing (CMP) step as depicted in FIG. 8 may be performed following the fill deposition step depicted in FIG. 6 to accomplish the photoresist removal, and to create a smooth surface upon which the sensor layers are next fabricated. As depicted in FIG. 8, the CMP process generally removes [most of] the fence material 120 and bumps 150. It therefore cures the major problems of the prior art process. However, it cannot remove the voids 154. These voids therefore remain and can collect contaminants, such as are found in the CMP polishing slurry or deionized water, which can create corrosion and other problems in a completed head.

Figure 9:
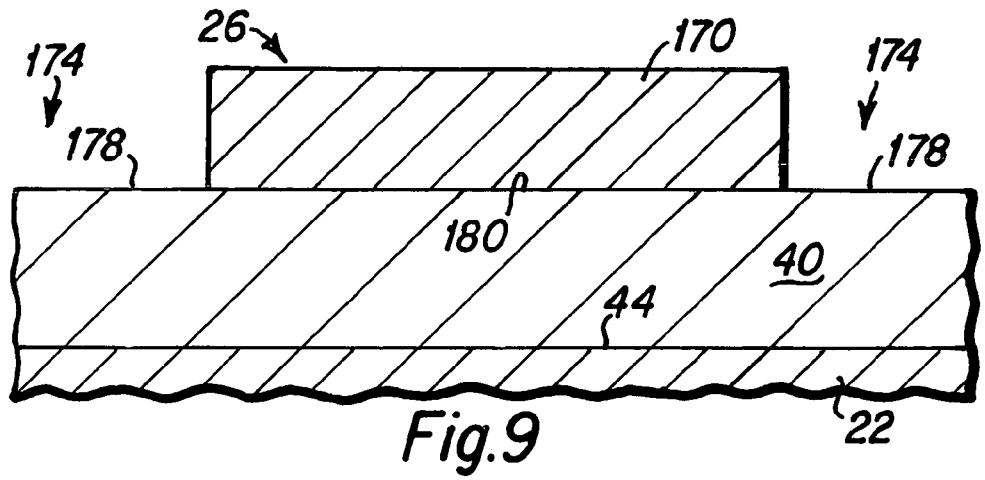
FIGS. 9-13 are elevational views depicting the fabrication method of another embodiment of the present invention.

Another magnetic head embodiment 26 of the present invention is created with improved fabrication techniques for creating the S1 shield pockets, and the fabrication method is next described with the aid of FIGS. 9-13. FIG. 9 is an elevational view of a first step of the magnetic head fabrication method of the present invention in which, preferably but not necessarily, a single layer patterned photoresist milling mask 170 is deposited upon an S1 magnetic shield 40, such that the openings 174 in the patterned photoresist expose the surface 178 of the magnetic shield 40 alongside masked magnetic shield surface areas 180 that correspond to the location above which sensor elements 52 will be fabricated. A bilayer photoresist may also be utilized.

Figure 10:
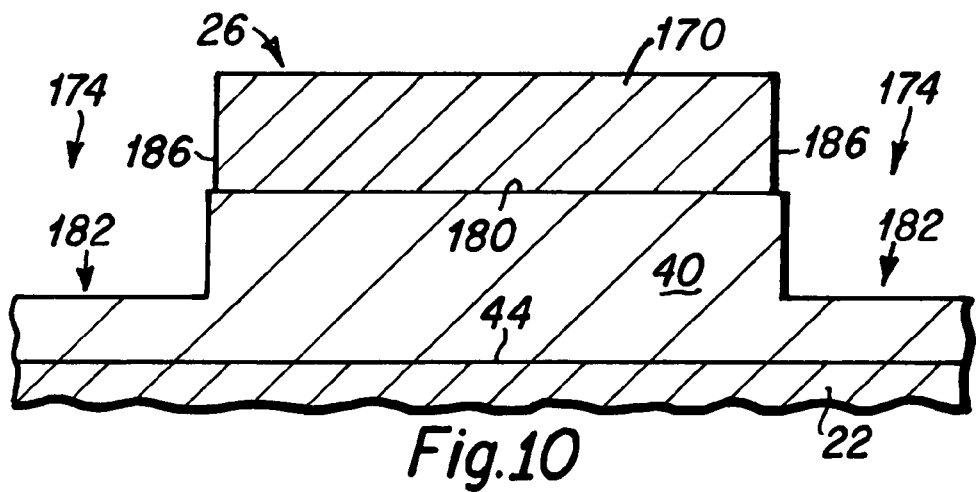

As is depicted in FIG. 10, an ion milling step is next undertaken to mill the surface 178 of the S1 shield in the opening locations 174 that are not protected by the photoresist 170 to create the S1 shield pockets 182. Ion milling is typically conducted at an angle of approximately 25° from normal to the shield surface to remove any redeposited S1 shield material. Where a single layer photoresist is used, the smooth sides 186 of the photoresist facilitate the removal of re-deposited material. Alternatively, a sputter etching step or a reactive ion etching step may be used in place of the ion milling step to create the pockets 182 in the S1 shield 40.

Figure 11:
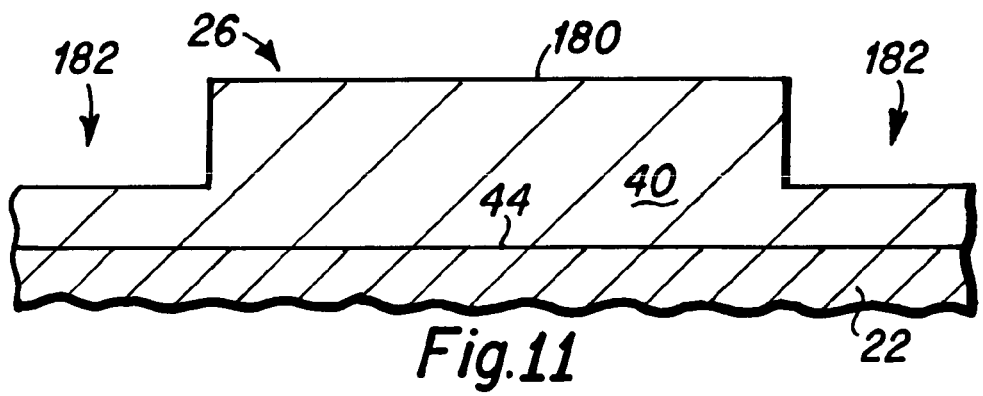

Thereafter, as is depicted in FIG. 11, the photoresist 170 is removed utilizing a standard wet chemical stripping process. This step differs from the prior art in that the photoresist is removed prior to the deposition of the fill layer material.

Figure 12:
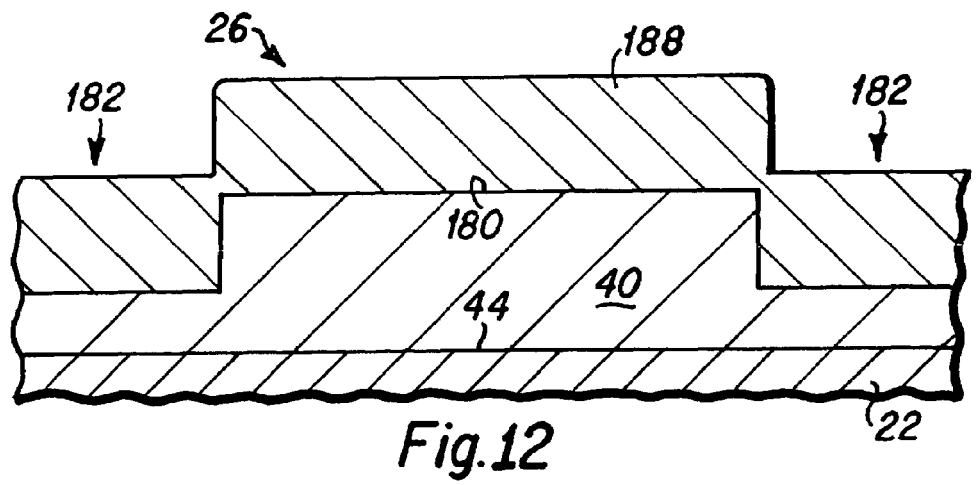

As is next seen in FIG. 12, fill layer material 188 is next deposited in sufficient thickness to fill the pockets 182. Because the photoresist 170 has already been removed, the conditions for any possible creation of bumps and voids at the edges of the pockets are likewise removed. This step may be compared to the prior art process step that is depicted in FIG. 6, in which the bilayer photoresist, with its undercuts, is present when the fill material 48 is deposited, whereby voids and bumps at the edges are created in the prior art magnetic head 38.

Figure 13:
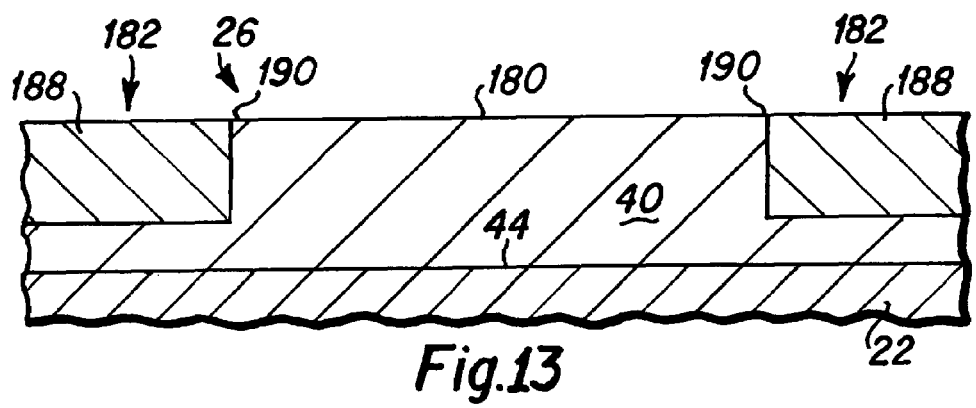

Following the deposition of the fill material layer 188, as is depicted in FIG. 13, a CMP step is conducted in which the fill layer 188 is removed down to the surface 180 of the S1 shield. As depicted in FIG. 13, the edges 190 of the shield at the location of the pockets 182 are smooth and sharp. There are no fences of redeposited magnetic shield material, there are no insulation material bumps, and there are no voids between the insulation layer and the edges of the pockets. Therefore the fence, bump and void problems of the prior art magnetic head 38 are cured with the magnetic head 26 that utilizes the fabrication process of the present invention.

Figure 14:
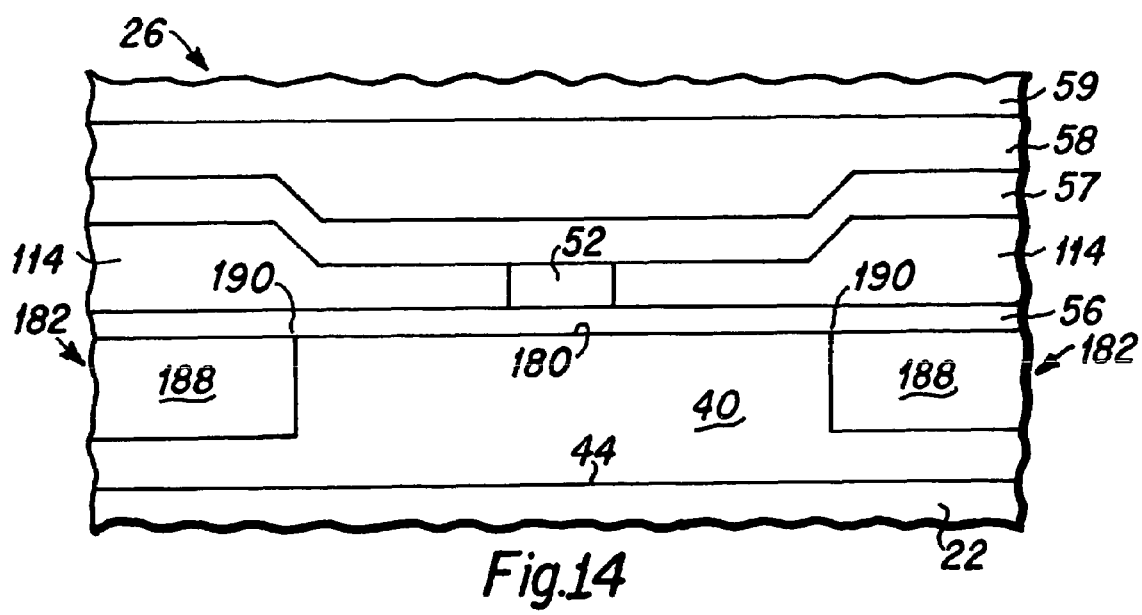
FIG. 14 is an elevational view depicting an embodiment of a magnetic head of the present invention fabricated in the steps of FIGS. 9-13.

FIG. 14 is an elevational view, taken from the ABS, of a magnetic head 26 of the present invention; it may be compared to the prior art magnetic head 38 view presented in FIG. 3 and described hereabove. As depicted in FIG. 14, the magnetic head 26 of the present invention includes a first magnetic shield 40 that is formed upon the surface 44 of the slider body material 22. The magnetic shield 40 includes pockets 182 formed therein. A fill layer 188 is fabricated within the pockets 182, such that the fill layer makes contact with the edges 190 of the pockets and no voids exist. A thin G1 insulation layer 56 is deposited across the wafer and a read head sensor 52 is fabricated upon the G1 insulation layer 56 above the shield surface area 180. Electrical leads 114 are subsequently fabricated to project outwardly from the sensor 52 towards the magnetic head electrical interconnects (not shown).

A second insulation layer (G2) 57 is fabricated above the sensor 52 and the electrical leads 114, and a second magnetic shield (S2) 58 is fabricated upon the second insulation layer 57. Further components of the magnetic head, as are known to those skilled in the art, and described hereabove with reference to FIG. 2, are subsequently fabricated upon the second magnetic shield 58, to ultimately complete the fabrication of a magnetic head 26 of the present invention. There are many, varied types of magnetic head components and structures that are known to those skilled in the art, and a magnetic head as contemplated by the present invention is intended to include all such components and structures as are compatible with S1 magnetic shield fabrication process that is described in detail herein.

Figure 15:
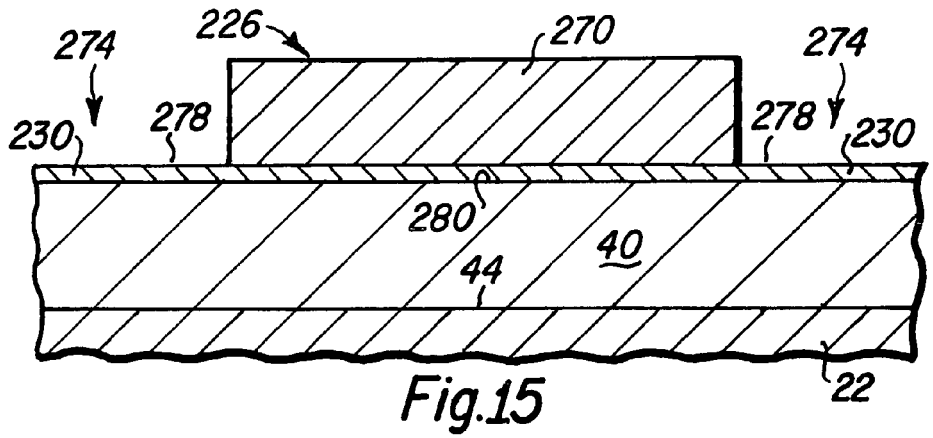
FIGS. 15-18 are elevational views depicting the fabrication method of another embodiment of the present invention.

Another magnetic head embodiment 226 of the present invention is created with improved fabrication techniques for creating the S1 shield pockets, as is next described with the aid of FIGS. 15-19. FIG. 15 is an elevational view of a first step of the magnetic head fabrication method of the present invention in which a thin, hard CMP stop layer 230 is first deposited upon the first magnetic shield 40. The CMP stop layer 230 is preferably comprised of a material such as diamond-like carbon (DLC), which is well known to those skilled in the art. Preferably, but not necessarily, a single layer patterned photoresist milling mask 270 is deposited upon the surface of the stop layer, such that the openings 274 in the patterned photoresist expose the surface 278 of the stop layer alongside masked surface areas 280 of the S1 shield 40 that correspond to the location above which sensor elements 52 will be fabricated. A bilayer photoresist may also be utilized.

Figure 16:
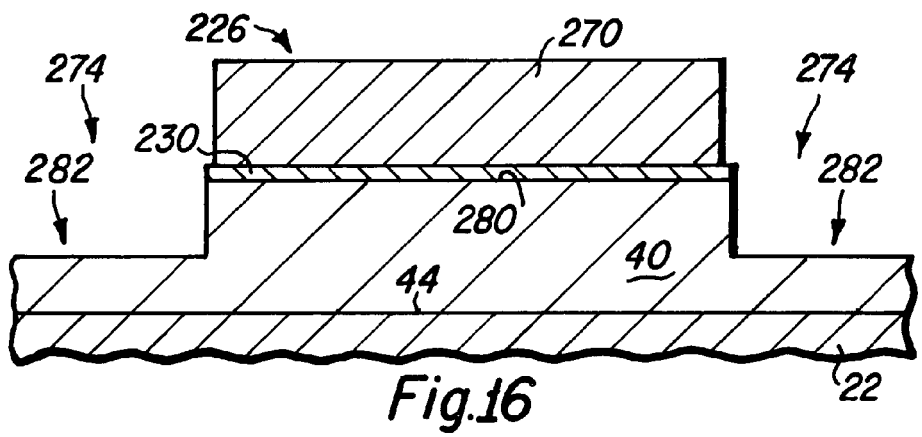

As is depicted in FIG. 16, an ion milling step is next undertaken to mill the surface 278 of the stop layer and the S1 shield in the opening locations 274 that are not protected by the photoresist 270 to create the S1 shield pockets 282. Ion milling is typically conducted at an angle of approximately 25° from normal to the shield surface to remove any redeposited S1 shield material. Alternatively, a sputter etching step or a reactive ion etching step may be used in place of the ion milling step to remove the stop layer and/or create the pockets 282 in the S1 shield 40.

Figure 17:
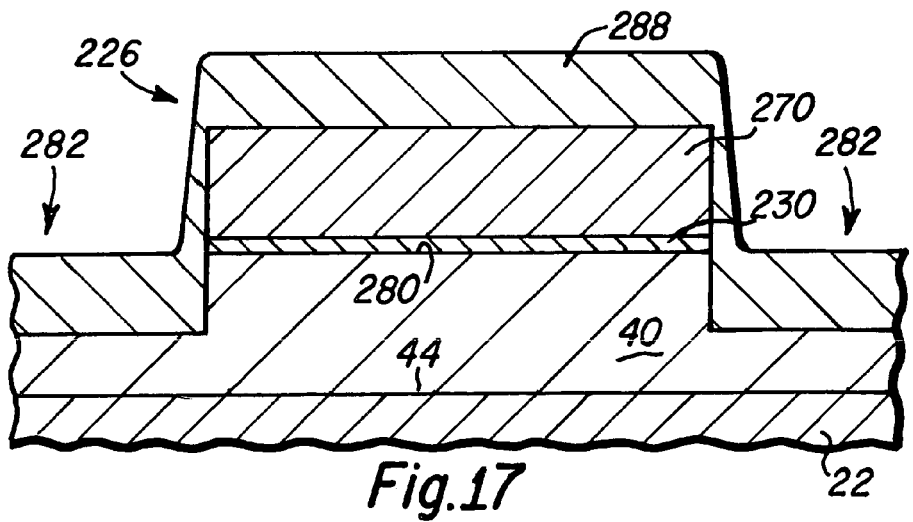
Figure 18:
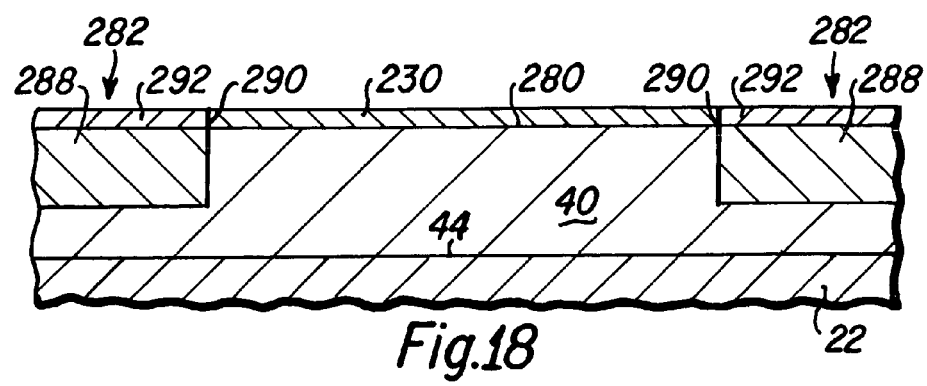

As is next seen in FIG. 17, fill layer material 288 is next deposited in sufficient thickness to fill the pockets 282. Following the deposition of the fill material 288, a second thin, hard CMP stop layer 292 (shown in FIG. 18) may be deposited upon the fill material. Thereafter, as is depicted in FIG. 18, a CMP step is conducted in which the excess fill material 288 and the photoresist layer 270 is removed down to the surface of the stop layer 230 above the S1 shield and the stop layer 292 above the fill 288 within the pockets 282. As depicted in FIG. 18, the edges 290 of the shield at the location of the pockets 282 are smooth and sharp. There are no fences of redeposited magnetic shield material, there are no insulation material bumps, and there are no voids between the insulation layer and the edges of the pockets. Therefore the fence, bump and void problems of the prior art magnetic head 38 are cured with the magnetic head 226 that utilizes this fabrication process of the present invention. As is next depicted in FIG. 19, the exposed CMP stop layers 230 and 292 are next removed, such as with a reactive ion etching (RIE) step using oxygen ion species where the stop layers are comprised of DLC, or more generally, a sputter etching or ion milling process with or without a reactive species such as oxygen.

Figure 19:
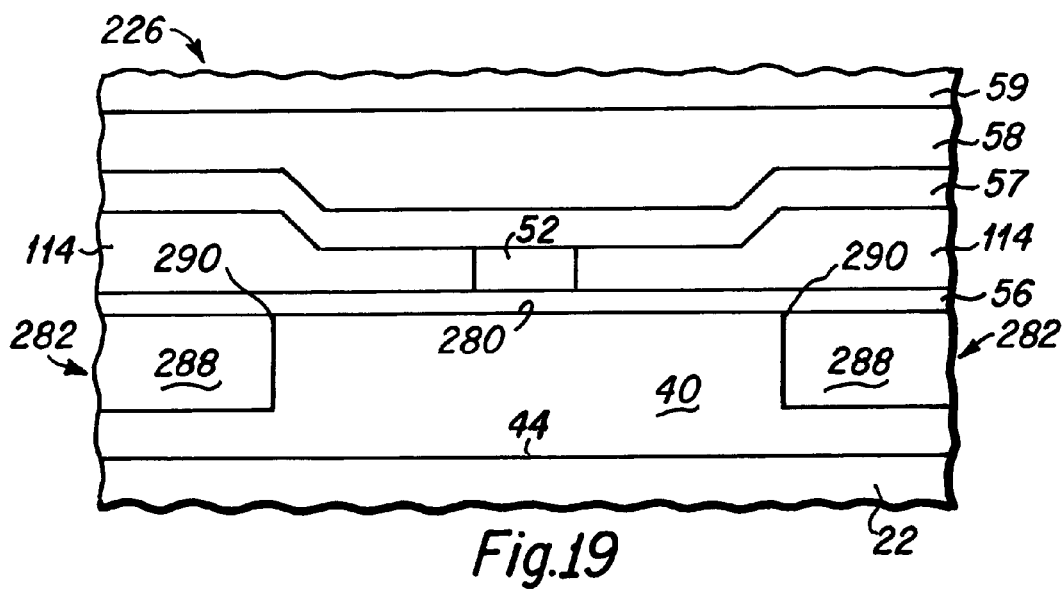
FIG. 19 is an elevational view depicting an embodiment of a magnetic head of the present invention fabricated in the steps of FIGS. 15-18.

FIG. 19 is an elevational view, taken from the ABS, of a magnetic head 226 of the present invention; it may be compared to the prior art magnetic heads 38 and 26 presented in FIGS. 3 and 14 respectively, and described hereabove. As depicted in FIG. 19, the magnetic head 226 of the present invention includes a first magnetic shield 40 that is formed upon the surface 44 of the slider body material 22. The magnetic shield 40 includes pockets 282 formed therein. A fill layer 288 is fabricated within the pockets 282, such that the fill layer 288 makes contact with the edges 290 of the pockets and no voids exist. A thin G1 insulation layer 56 is deposited across the wafer and upon the upper surfaces of the S1 shield 40 and the fill layer 288 within the pockets 282, and a read head sensor 52 is fabricated upon the G1 insulation layer 56 above the shield surface area 280. Electrical leads 114 are subsequently fabricated to project outwardly from the sensor 52 towards the magnetic head electrical interconnects (not shown).

A second insulation layer (G2) 57 is fabricated above the sensor 52 and the electrical leads 114, and a second magnetic shield (S2) 58 is fabricated upon the second insulation layer 57. Further components of the magnetic head, as are known to those skilled in the art, and described hereabove with reference to FIG. 2, are subsequently fabricated upon the second magnetic shield 58, to ultimately complete the fabrication of a magnetic head 26 of the present invention. There are many, varied types of magnetic head components and structures that are known to those skilled in the art, and a magnetic head as contemplated by the present invention is intended to include all such components and structures as are compatible with S1 magnetic shield fabrication process that is described in detail herein.

While the present invention has been shown and described with regard to certain preferred embodiments, it is to be understood that modifications in form and detail will no doubt be developed by those skilled in the art upon reviewing this disclosure. It is therefore intended that the following claims cover all such alterations and modifications that nevertheless include the true spirit and scope of the inventive features of the present invention.

What is claimed is:

1. A method for fabricating a magnetic head, comprising:
fabricating a first magnetic shield layer upon a slider substrate;
fabricating a chemical mechanical polishing (CMP) stop layer upon said first magnetic shield layer;
fabricating a patterned photoresist layer upon said CMP stop layer, where openings in said photoresist layer expose an upper surface of said CMP stop layer;
forming a pocket having a pocket depth by ion milling within said surface of said first magnetic shield layer at said openings in said photoresist layer;
depositing a fill layer upon said photoresist layer, such that said fill layer is sufficiently thick to fill said pocket;
performing a chemical mechanical polishing step to remove said photoresist layer and portions of said fill layer down to said CMP stop layer;
removing said CMP stop layer to expose said first magnetic shield layer;
fabricating a sensor upon said first magnetic shield layer;
fabricating electrical leads to electrically connect said sensor with magnetic head electrical interconnects;
fabricating a second insulation layer upon said sensor and upon said electrical leads;
fabricating a second magnetic shield layer upon said second insulation layer.

2. The method for fabricating a magnetic head as described in claim 1 wherein said photoresist layer is a single layer of photoresist.

3. The method for fabricating a magnetic head as described in claim 1 wherein said photoresist layer is a bilayer photoresist.

4. The method for fabricating a magnetic head as described in claim 1 wherein said ion milling step is conducted partially at an angle that is approximately 25° away from normal to said surface of said first magnetic shield layer.

5. The method for fabricating a magnetic head as described in claim 1 including:
   fabricating a second CMP stop layer upon said fill layer prior to performing the chemical mechanical polishing step.

6. The method for fabricating a magnetic head as described in claim 5 wherein the step of fabricating a sensor includes depositing an insulation gap layer upon said first magnetic shield layer.

7. The method for fabricating a magnetic head as described in claim 6 wherein said second CMP stop layer is removed before depositing said insulation gap layer.

8. The method for fabricating a magnetic head as described in claim 5 wherein said second CMP stop layer is comprised of diamond-like-carbon.

9. The method for fabricating a magnetic head as described in claim 5 wherein said thickness of said fill layer is approximately equal to said pocket depth, and said second CMP stop layer is fabricated to be coplanar with said CMP stop layer.

10. The method for fabricating a magnetic head as described in claim 1 wherein said sensor is fabricated upon said first magnetic shield in locations that are away from said pocket.

11. The method for fabricating a magnetic head as described in claim 1 wherein said CMP stop layer is comprised of diamond-like-carbon.

* * * * *